United States Patent [19]

Rijckaert et al.

[11] 4,451,862
[45] May 29, 1984

[54] MAGNETIC HEAD MOUNTING MECHANISM FOR AUTOMATIC AZIMUTH CONTROL

[75] Inventors: Albert M. A. Rijckaert, Eindhoven, Netherlands; Henricus M. Ruyten, Vienna, Austria; Johannes F. Hoefnagels; Johannes J. M. Schoenmakers, both of Eindhoven, Netherlands

[73] Assignee: U.S. Philips Corporation, New York, N.Y.

[21] Appl. No.: 454,212

[22] Filed: Dec. 29, 1982

Related U.S. Application Data

[63] Continuation of Ser. No. 187,657, Sep. 16, 1980.

[30] Foreign Application Priority Data

Sep. 28, 1979 [NL] Netherlands .................. 7907218

[51] Int. Cl.³ .................. G11B 5/56; G11B 21/24
[52] U.S. Cl. .................. 360/109
[58] Field of Search ............ 360/109, 105, 104, 130.21

[56] References Cited

U.S. PATENT DOCUMENTS 4,329,723 5/1982 Schoenmakers .................. 360/109

FOREIGN PATENT DOCUMENTS

53-17316 2/1978 Japan .
54-3506 1/1979 Japan .

Primary Examiner—Robert Martin Kilgore
Attorney, Agent, or Firm—David R. Treacy

[57] ABSTRACT

A tape recorder or player with automatic azimuth control, utilizing a single pieozoelectric element inside the head's magnetic shield. A bimorph has one end rigidly connected to the head and the other end rigidly connected to the head support, for pivoting the head about an axis in line with the head gap.

30 Claims, 10 Drawing Figures

MAGNETIC HEAD MOUNTING MECHANISM FOR AUTOMATIC AZIMUTH CONTROL

This is a continuation, of application Ser. No. 187,657, filed Sept. 16, 1980.

BACKGROUND OF THE INVENTION

The invention relates to an apparatus for recording and/or reproducing information on a magnetic tape, provided with a frame portion, on which is arranged at least one head support which carries a magnetic head and a positioning device, which prsitioning device comprises an electromechanical deflection element which is rigidly connected to the head support and which comprises mounting or fixing portions adjacent two opposite edges of the element, including a fixing portion which is connected to the magnetic head and the magnetic head being pivotable relative to the head support by the deflection element in order to adjust the azimuth-angle position of the magnetic head.

For the reproduction of information recorded in tracks on a magnetic tape it is of great importance that the azimuth-angle position of the magnetic head relative to the axis of the relevant information tracks to be reproduced is correctly aligned during the reproduction process. A deviating azimuth-angle position of the magnetic head, which deviation is the so-called "azimuth error", results in a less satisfactory reproduction of the higher frequencies of the information signal. As an example, an azimuth error of only a few minutes of arc may result in a reduction of the high-frequency reproduction of an audio signal by a few kHz. This problem inter alia occurs frequently when prerecorded magnetic-tape cassettes are played back, whose magnetic tape is modulated outside the cassette by means of professional equipment and is subsequently accommodated in the cassette, which may give rise to azimuth errors because the tape guidance within the cassette is frequently poor.

In an apparatus of the aforementioned type, known from the U.S. Pat. No. 3,526,726, azimuth angles are eliminated by pivoting the magnetic head by means of a positioning device. For this so-called "azimuth correction" the positioning device comprises two piezo-electric deflection elements, situated one to each side of the magnetic head, which elements are each rigidly connected to the head support at their centers. The top and bottom ends of each deflection element are connected to the magnetic head through elastic hinges. Because of this fairly intricate construction of the positioning device, the maximum deflection of the deflection elements and thus the maximum attainable pivoting range of the magnetic head and the maximum azimuth error that can be corrected are comparatively small. When the magnetic head is pivoted mutual positioning deviations may occur between each deflection element and the magnetic head owing to the hinged connections, so that the azimuth correction is performed with a delay or incompletely.

SUMMARY OF THE INVENTION

It is the object of the invention to provide a magnetic tape playback apparatus with a positioning device which is capable of correcting comparatively large azimuth errors in a reliable manner.

In accordance with the invention the positioning device comprises only one deflection element, of which deflection element only a first fixing portion is connected to the magnetic head and a second fixing portion is connected to the head support, which connections are both rigid.

In this way the electromechanical deflection element of an apparatus in accordance with the invention can perform a comparatively large deflection and can thus pivot the magnetic head through such an angle that even considerable azimuth errors can be corrected. Owing to the rigid connection between the first fixing portion of the deflection element and the magnetic head the magnetic head accurately follows the movement of the first fixing portion, so that an azimuth error is corrected effectively. Thus, through an effective azimuth correction, the apparatus can reproduce information signals recorded on a magnetic tape without loss of high frequencies under substantially all conditions, regardless of the azimuth angle position of the magnetic head which has been used for recording.

The positioning device together with the magnetic head can form a compact unit, so that the invention is particularly suitable for use in equipment where only a small space is available around the magnetic head.

In order to obtain a satisfactory protection against extraneous mechanical or electromagnetic influences an embodiment of an apparatus in accordance with the invention is characterized in that the positioning device and the magnetic head are enclosed by a shield, which is at least partly constituted by the head support.

In order to minimize the dimensions of the shield and yet obtain a satisfactory protection, this embodiment is further characterized in that the deflection element is situated in a space which is bounded by a wall of the magnetic head and of the shield respectively, and in a rest position the piezo-electric element extends substantially parallel to said walls.

In order to obtain a sufficiently reliable rigid connection of the deflection element which can withstand mechanical influences, it is advantageous if, in accordance with a further embodiment, the first and second fixing portions of the deflection element are rigidly mounted on a first holder and a second holder respectively of the positioning device, which holders are secured to a wall of the magnetic head and a wall of the shield respectively.

In yet another embodiment of the apparatus in accordance with the invention the second holder and the wall of the shield are provided with mutually cooperating adjusting means which enable the position of the second holder relative to the wall of the shield to be adjusted. This provides the possibility of accurately positioning the magnetic head together with the positioning device relative to the shielding cover.

An effective protection of the deflection element against an excessive deflection is obtained in still another embodiment of the apparatus in accordance with the invention, in which the holders each comprise at least one portion constituting a stop, which portions limit the pivotal movement of the magnetic head relative to the head support in both directions.

In order to counteract the influence of forces acting on the magnetic head, such as frictional forces resulting from the movement of a magnetic tape across the magnetic head, it is of advantage if, in another embodiment of an apparatus in accordance with the invention, the positioning device also comprises at least one elastic hinge, whose hinge axis coincides with the axis about which the magnetic head is pivotable by means of the deflection element. Thus, the operation of the deflection element cannot be impaired by forces exerted on the magnetic head.

A suitable construction of this embodiment is further characterized in that there are provided two elastic hinges, which are situated on opposite sides of the deflection element and which are each connected to the two holders.

In a further embodiment of an apparatus in accordance with the invention in which the magnetic head can be adjusted to the nominal azimuth-angle position, the head support is supported on the frame portion by means of at least one knife-edge bearing so as to be capable of pivotal movement, which pivotal movement also enables the azimuth-angle position of the magnetic head to be adjusted.

In order to obtain a suitable location of the pivotal axis about which the magnetic head is pivotable by the deflection element when a magnetic head is used which comprises two air gaps bounded by associated magnetic cores, a further embodiment of an apparatus in accordance with the invention is characterized in that the deflection element is situated substantially completely within the magnetic head, symmetrically relative to the air gaps, in a space formed between the magnetic cores.

In another suitable embodiment of an apparatus in accordance with the invention the apparatus is provided with both a magnetic recording head for recording information and a magnetic reproducing head for reprodicing information, only the magnetic reproducing head being connected to the head support by means of the positioning device. Thus, the position of the magnetic recording head is not influenced by the azimuth correction of the magnetic reproducing head. This embodiment provides the advantage that during recording the correct position of the axis of a track to be recorded on a magnetic tape is not disturbed by the action of the positioning device.

The invention will be described in more detail with reference to the drawings, which show some embodiments to which the invention is not limited.

DESCRIPTION OF THE PREFERRED EMBODIMENTS

Figure 1:
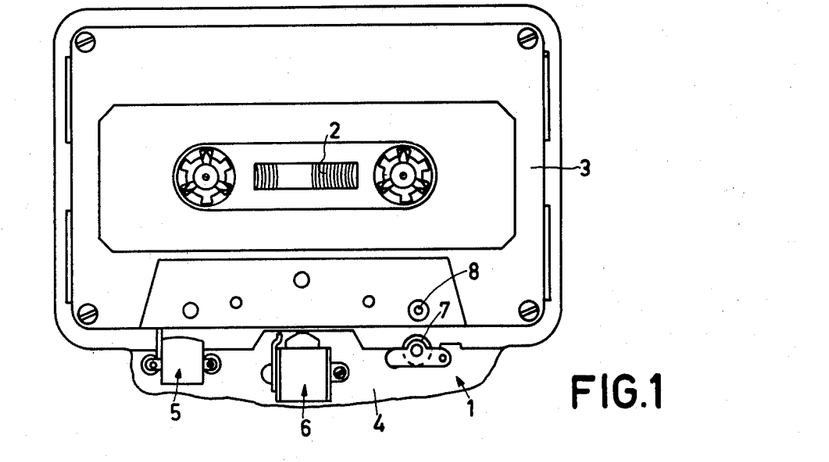
FIG. 1 is a plan view of a part of an apparatus in accordance with the invention.

FIG. 1 shows the relevant parts of an apparatus 1 which enables audio information to be recorded on and/or reproduced from a magnetic tape 2 contained in a substantially rectangular cassette 3. The tape is wound on two winding hubs and is passed between the winding hubs along a long side of the cassette.

The apparatus is provided with a frame portion 4 which is connected to the remaining part of the apparatus in such a way as to be movable relative to the cassette 3. The frame portion 4 serves as a head mounting plate for two magnetic heads, such as a magnetic erase head 5 and a combined magnetic recording/reproducing head 6. At or near its long side the cassette has a side wall in which a number of openings are formed which enable the magnetic heads 5 and 6 to be brought into operative contact with the magnetic tape 2 by moving the frame portion 4 in the direction of the cassette, and which enable the magnetic head to be pressed againt a capstan 8 by means of a pressure roller 7. The which capstan is coupled to a drive mechanism, not shown, of the apparatus.

Figure 2:
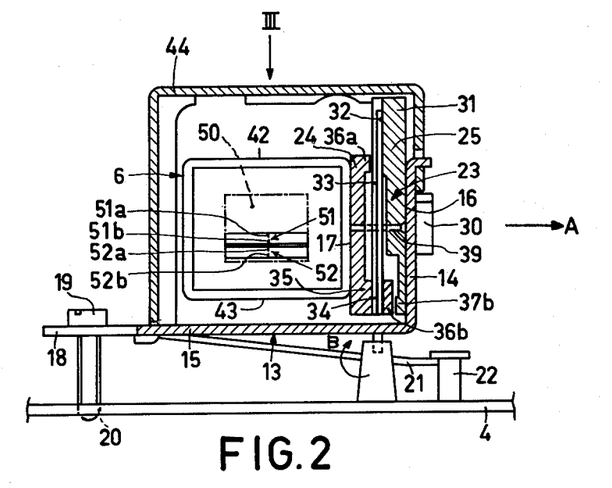
FIG. 2 is a partial cross-section and partial elevation on an enlarged scale of a part of the apparatus of FIG. 1.
Figure 3:
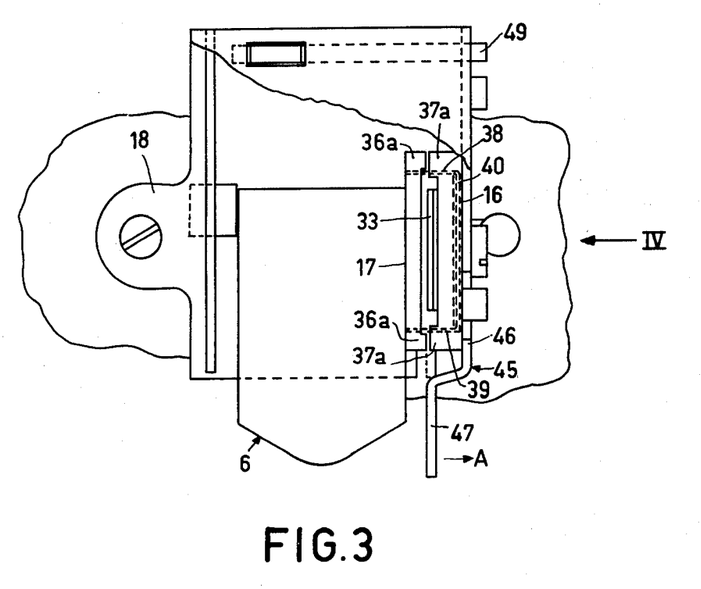
FIG. 3 is a plan view in accordance with the arrow III in FIG. 2.
Figure 4:
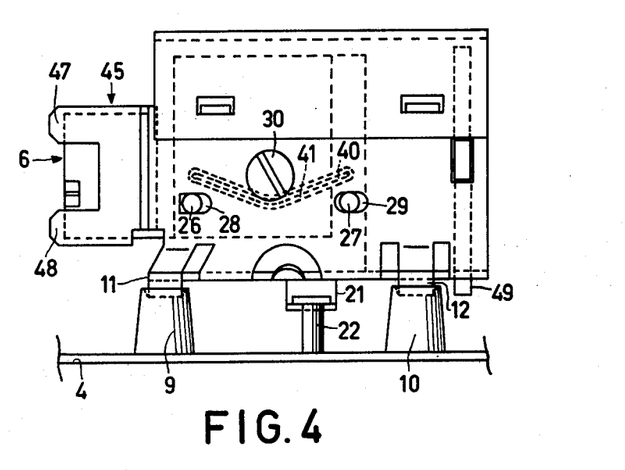
FIG. 4 is an elevation in accordance with the arrow IV in FIG. 3.

In a first embodiment of the invention, the magnetic head 6 is arranged above the frame portion 4 in the manner shown in FIGS. 2 to 4. For this purpose the frame portion 4 comprises two mutually spaced fixed supports 9 and 10, each of which has a slot in its top surface, facing the magnetic head 6. End portions of tabs 11 and 12 are lightly pressed against the slot bottoms, and function as knife-edge bearings about which the magnetic head is pivotable relative to the frame portion 4. Suitably, the common pivotal axis of these knife-edge bearings extends at least substantially at right angles to the long side wall of the cassette 3. The tabs 11 and 12 form part of a head support 13, which has a vertical supporting portion 14 as well as a base portion 15 which extends substantially at right angles to the supporting portion. As is shown in FIGS. 2 and 4, the tabs 11 and 12 are close to the supporting portion 14. The tabs 11 and 12 are shaped so that the end portions of the tabs, with respect to the direction of tape transport during reproduction or recording, indicated by the arrow A in the FIGS. 2 and 3, are situated in a plane lying substantially halfway between substantially parallel opposed walls 16 and 17 of the supporting portion 14 and the magnetic head 6 respectively. Along the edge which is remote from the supporting portion 14 the base portion 15 is provided with a projection 18 in which an opening is formed through which an adjusting screw 19 passes. The far end of the screw 19 engages a threaded hole 20 in the frame portion 4. To bias the head support 13 agaiint the knife-edge bearings, a resilient strip 21 extends obliquely downward from the base strip 15, which resilient portion has a free end remote from the base portion, fitted underneath the head of a stud 22 on the frame portion 4. As is shown in FIG. 2 the resilient portion tends to pivot the head support 13 about the knife-edge bearings in the direction of the arrow B, so that the projection 18 is urged against the head of the screw 19.

Against the wall 16 a positioning device 23 is mounted, by means of which the magnetic head 6 is connected to the head support 13. For this purpose the positioning device 23 includes first and second holders 24 and 25, made of an easy-to-manufacture yet rigid material, such as die-casting zinc. As viewed in FIG. 2 the first holder 24 extends over the entire height of the wall 17 of the head 6, and which is preferably glued to the wall 17.

In order to enable the holder 25 to be positioned relative to the supporting portion 14 and thus relative to the head support 13, the second holder 25 and the supporting portion 14 are provided with mutually co-operating adjusting means. These means are constituted by adjusting pins 26 and 27 provided on the holder 25, which pins, as shown in FIG. 4, are situated in adjusting slots 28 and 29 respectively in the supporting portion 14. The longitudinal axes of the respective slots 28 and 29 preferably extend perpendicularly to the long side wall of the cassette 3 so that the distance of the magnetic head from the relevant long side wall of the cassette 3 can be adjusted by moving the pins 26 and 27 in the slots 28 and 29 respectively. This is of importance to allow accurate adjustment of the distance over which the magnetic head 6 is movable into the cassette 3 through the movement of the frame portion 4. The second holder 25 is furthermore provided with a bolt 30, whose head is positioned against the supporting portion 14 and whose shank is guided in a slot formed in the supporting portion 14 in such a way that this bolt does not impair the operation of the said adjusting means. After the magnetic head has been positioned by means of the adjusting means the bolt 30 is tightened, so that the second holder 25 is secured. As viewed in FIG. 2 the second holder 25 extends along the supporting portion 14, the upper part of the holder 25 being situated at a distance above the top of the supporting portion 14.

The upper part of the holder 25 constitutes a supporting portion 31, against which an upper mounting portion 32 of an electromechanical piezoelectric ceramic deflection element 33 is fixed. The upper mounting portion 32 is situated adjacent the top edge of the piezo-electric element 33. Adjacent its bottom edge the piezo-electric element has another mounting portion 34, which is fixed on a supporting portion 35 of the first holder 24. The mounting portions 34 and 32 will be referred to hereinafter as the "first" and the "second" fixing portion, respectively. Preferably, a rigid connection is made between the piezo-electric element and the holders 24 and 25 by gluing. This ensures that adjacent its bottom and top edges the piezo-electric element is rigidly connected to the magnetic head 6 and the head support 13, respectively. The active part, which is situated between the fixing portions, is situated freely and is thus movable together with the first fixing portion 34 relative to the holder 25 in a manner to be discussed hereinafter. This movement is limited by portions constituting stops which are formed on the holders 24 and 25 and which are constituted by pairs of projections 36a and 37a on the holders 24 and 25 respectively, as well as by a projection 36b glued to the element 33 and a projection 37b, provided on the holder 25. As is apparent from FIGS. 2 and 3, the projections 36a and 37a are situated one on each side of the element 33 at the level of the adjacent supporting portion 31 of the second holder 25. As is also shown in FIG. 2, the piezo-electric element 33 lies substantially halfway between the walls 16 and 17. When it is in a neutral rest position, the element 33 is situated straight above the said knife-edge bearings in the aforesaid plane which contains these bearings and which extends substantially parallel to said walls.

As is shown in FIGS. 2 to 4, elastic hinges 38 and 39 are situated one on each side of the piezo-electric element 33 between the holders 24 and 25. The hinges 38 and 39 are constituted by end portions of a wire spring 40, which portions are connected to the two holders 24 and 25, the diameter of said spring being approximately 0.10 to 0.15 mm and a central portion of the spring being situated in a groove 41 in the holder 25, as shown in FIG. 4. Suitably, the groove 41 comprises two parts which form an obtuse angle with each other, the central portion of the spring 40 having a corresponding shape. It has been found that owing to this shape the location of the pivotal axis of the elastic hinges most accurately coincides with the pivotal axis about which the magnetic head is pivotable by the piezo-electric element in a manner to be described hereinafter.

Suitably, the magnetic head is mounted in such a way relative to the piezo-electric element 33 that the fixing portions 32 and 34 of the piezo-electric element are situated near the corners formed between the side wall 17 and the adjoining bottom and top walls 43 and 42 of the magnetic head. As a result of this, the active portion of the piezo-electric element 33, in a direction perpendicular to the frame portion 4, has a dimension which substantially corresponds to the distance between the walls 42 and 43.

On the head support 13 there is furthermore arranged a substantially U-shaped cover 44, which together with the supporting portion 14 and the base portion 15 of the head support constitutes a shield which encloses the positioning device 23 and the magnetic head 6 and which protects the magnetic head and the positioning device against extraneous mechanical or electromagnetic influences.

The head support 13 is furthermore provided with a tape guide 45, which adjoins the supporting portion 14 and which extends towards the said long side wall of the cassette 3, and of which tape guide a portion 46 is shaped so that adjoining tape-guide limbs 47 and 48 are situated in a plane which is spaced at approximately equal distances from the walls 16 and 17 and is parallel to these walls. Thus, both the pivotal axis of the knife-edge bearings and the piezo-electric element 33, the pivotal axis of the elastic hinges 38 and 39 and the tape-guide limbs 47 and 48 are situated in a plane which is situated halfway between said walls 16 and 17. The holder 24 is preferably glued against the wall 17 in such a position that when the element 33 is in the restposition, the limbs 47 and 48 are accurately aligned relative to the upper and lower side of the head face 50.

On the side which is remote from the cassette 3 the head support 13 is provided with a connection plate 49, on which the various connections of the magnetic head 6 and the piezo-electric element 33 are arranged.

The operation of the apparatus described in the foregoing is as follows. The magnetic tape 2 in the cassette 3 is provided with recorded information by means of a magnetic recording head, which information is contained in a number of tracks on the tape. During playback, in order to avoid a poor reproduction of higher frequencies of the information signal, it is of importance that the azimuth-angle position of the magnetic head relative to the axis of the relevant information track to be reproduced is correctly adjusted. In this respect, "azimuth-angle position" is to be understood to mean the angle which the longitudinal axes of respective gaps 51 and 52 which terminate in the head face 50, form with the axis of the relevent information track, the magnetic head generally having a correct azimuth-angle position if the longitudinal axes of the air gaps extend perpendicularly to the axis of the information track these axes therefore defining an orthogonal coordinate system.

Specifically, if the information has been recorded with a different apparatus, but also if the information has been recorded on the relevant magnetic tape by a different magnetic head of the same apparatus, it frequently occurs that during reproduction the azimuth-angle position has a specific deviation from the perpendicular position, which deviation constitutes the so-called "azimuth error". For example, an azimuth error of only a few minutes of arc may reduce the high frequency response for an audio signal by a few kHz. For an effective method of detecting an incorrect azimuth-angle position and supplying a control signal to a magnetic-head positioning device in order to eliminate an azimuth error, reference is made to the non-prepublished Netherlands Patent Application No. 78 05803 to which U.S. patent application Ser. No. 41,673 filed May 23, 1979 corresponds (now U.S. Pat. No. 4,317,144), and for a favourable embodiment of a magnetic head which is adapted to be used in conjunction with this method reference is made to the non-prepublished Netherlands Patent Application No. 78 05801 to which U.S. patent application Ser. No. 41,674 filed May 23, 1979 corresponds. In a preferred embodiment of an apparatus in accordance with the invention, use is made of the method and the magnetic head in accordance with these applications, the air gaps 51 and 52 being divided into gap halves 51a, 51b and 52a, 52b respectively, the lower half and the upper half of the relevant information track being separately scanned at the same time with the gap halves 51a, 51b and 52a, 52b respectively. In a manner not shown the output signals of the gap halves of the relevant air gap 51 or 52 are applied to a phase discriminator, which produces a control signal which is a measure of the phase difference between the said output signals and and thus of the azimuth error obtaining, which control signal is applied through a control circuit of the apparatus to the piezo-electric element 33 of the positioning device 23 in order to correct the azimuth error by positioning the magnetic head. This is generally referred to as "azimuth correction".

Figure 5:
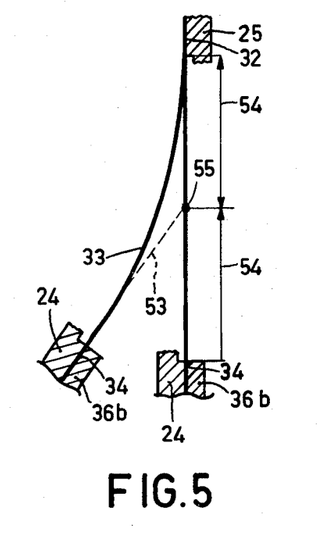
FIG. 5 schematically illustrates the operation of a deflection element in an apparatus in accordance with the invention.

In the embodiment shown the piezo-electric deflection element 33 comprises two layers of a piezo-electric material, which layers are polarized perpendicularly to the surface, the directions of polarisation of the two layers being opposed to one another. The element 33 shown is of the so-called "bimorph" type, which means that, in addition to two electrodes which are situated on the respective outer sides of the element, and which are connected to the control circuit, a conductive electrode is arranged between the two layers. As is schematically shown in FIG. 5, the piezo-electric element 33 is rigidly connected to the second holder 25 through the second fixing portion 32. In this way the fixing portion 32 is rigidly connected to the head support. If a control voltage is applied to the element 33 through the external electrodes, which voltage is supplied by the control circuit of the apparatus, the element has the property of bending with a constant curvature along the length of the element in any given position into which the element bends. As a result of this, the first fixing portion 34 of the element will perform a pivotal movement. As the fixing portion 34 is secured to the first holder 24 and is thus rigidly connected to the magnetic head 6, the magnetic head will also be pivoted under the influence of the control voltage. Owing to the property of the element 33 of bending with a constant curvature upon pivoting, a line 53 tangential to the fixing portion 34 constantly extends through a point which in the neutral position of the element 33 is situated at equal distances, designated by the reference numeral 54, from the two fixing portions 32 and 34. Thus, the position of a pivotal axis 55 about which the pivotal movement is effected is accurately defined by the distance 54. The pivotal axis 55 extends at least substantially perpendicularly to a plane tangential to the head face 50 at the location of the termination of the air gaps 51 and 52. The pivotal axis 55 coincides with the pivotal axis of the elastic hinges 38 and 39 and owing to the arrangement of the fixing portions 32 and 34 relative to the magnetic head 6 is situated at substantially equal distances from the top and bottom walls 42 and 43 of the magnetic head 6. This location of the pivotal axis in combination with the presence of the elastic hinges 38 and 39 and this lies on one of the orthogal coordinate system axes defined by the gaps and tape travel direction, ensures that forces acting on the magnetic head, such as those resulting from the tape tension at the location of the magnetic head as a result of the friction caused by the movement of the magnetic tape across the head face 50 and also forces resulting from impact forces exerted on the apparatus, are effectively absorbed and cannot significantly influence the piezo-electric element 33 and thus cannot disturb the operation of the element. Moreover, the piezo-electric element 33 is thus protected against overloading. A very effective protection of the element, in order to limit the maximum permissible deflection of the piezo-electric element, is simply realised by the presence of portions constituting stops, comprising the projections 36a, 36b, 37a, and 37b. In the neutral position of the piezo-electric element these projections are spaced at small distances from each other; in the embodiment shown this distance is preferably approximately 0.05 mm.

Owing to the large effective length of the active portion of the element 33 a substantial pivotal movement of the magnetic head 6 between the portions constituting stops is possible; a maximum pivotal movement of approximately 20 minutes of arc can be realised with this construction, such a positioning range enabling the apparatus to eliminate azimuth errors occurring under almost all normal conditions by azimuth correction. Moreover, owing to the presence of the knife-edge bearings between the head support 13 and the frame portion 4, it is possible, in addition to this automatic azimuth correction, to influence the azimuth-angle position of the magnetic head additionally over a large range. As a result of this, the magnetic head can accurately be adjusted to its nominal position during assembly, which means that when the element 33 is in the non-energized rest position the head is adjusted so that the air gaps 51 and 52 occupy the correct perpendicular position relative to the longitudinal axis of a magnetic tape. Moreover, this permits a readjustment in a situation in which a correction of the neutral position of the element 33 is desired, for example owing to the occurrence of hysteresis effects in the element 33 and the co-operating parts of the positioning device 23. The integrated design of the head support 13, with the resilient portion 21 tending to pivot the magnetic head in the direction of the arrow B in FIG. 2, renders this adjustment very simple.

The mutually co-operating adjusting means with which the second holder 25 and the supporting portion 14 are provided, enable the magnetic head and the tape guide 45 to be adjusted in a horizontal direction relative to the said long side wall of the cassette 3 and the frame portion 3, as described in the foregoing. As the height of the magnetic head 6 relative to the frame portion 4 is determined by the various parts of the frame portion 4, which can be accurately manufactured, the head support 13 and the positioning device 23, no further height adjustment of the magnetic head relative to the frame portion 4 is then necessary. However, in certain situations it may be desirable to have a certain height adjustment of the magnetic head 6, which is possible by slightly widening the holes 28 and 29 in a vertical direction relative to the frame portion 4, in a manner not shown, so that the pins 26 and 27 can also be adjusted in a vertical direction.

Owing to the favourable location of the pivotal axis 55 at the side of the magnetic head substantially halfway between the top and bottom of the head the displacement of the air gaps 51 and 52 in the direction A during pivoting of the head about the pivotal axis 55 is negligible, so that the so-called "wow-and-flutter" resulting from such a displacement is nil. A slight height variation of the magnetic head 6 relative to the frame portion 4 may occur, so that the location of the air gap 51 or 52 relative to the information track on the tape is slightly shifted, but this height variation is so small, having regard to the location of the pivotal axis 55 in the direct vicinity of the wall 17 of the magnetic head and at a level approximately halfway between the tape guide limbs 47 and 48, that in general no significant deterioration of the information signal to be reproduced occurs.

Figure 6:
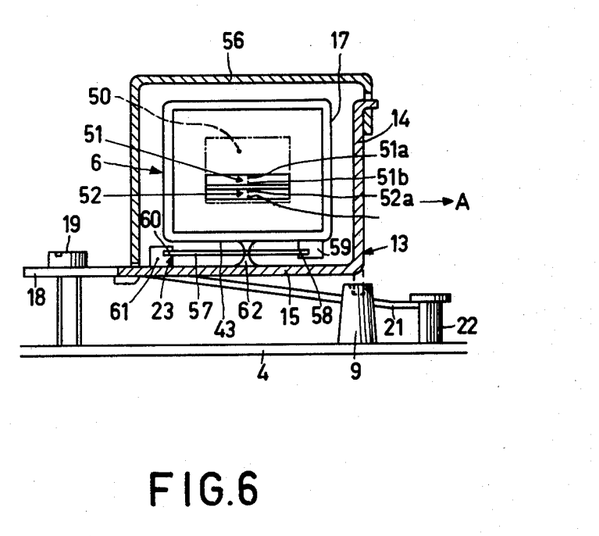
FIG. 6 is a partial cross-section and partial elevation on an enlarged scale of a part of a second embodiment of an apparatus in accordance with the invention.

FIG. 6 shows an arrangement of the positioning device 23 in a second embodiment of an apparatus in accordance with the invention, which may exhibit a small displacement of the magnetic head in the direction A as a result of azimuth correction, but which exhibits substantially no height variation relative to the frame portion 4. For this purpose a piezo-electric deflection element 57, which substantially corresponds to the element 33 of the preceding embodiment, is situated at the underside of the magnetic head 6 between the bottom wall 43 of the magnetic head and the upper surface of the base portion 15 of the head support 13. As in the preceding embodiment the magnetic head and the positioning device are enclosed by a shield which is constituted by the head support 13 and a cover 56. In the neutral position shown the piezo-electric element 57 extends substantially parallel to the bottom wall and is secured to a first holder 59 through first fixing portion 58 by glueing or clamping. Holder 59 is preferably glued to the wall 43 near its junction with the wall 17. In this way the first fixing portion 58 of the element 57 is rigidly connected to the magnetic head. In a similar way the element 57 is rigidly connected to the magnetic-head support 13 via a second fixing portion 60 and a second holder 61. The holders 59 and 61 also constitute stops which limit the pivotal movement of the magnetic head 6. Substantially halfway between the fixing portions 58 and 60, on both sides of the element 57, there is situtated an elastic hinge 62 whose pivotal axis, as in the preceding embodiment, coincides with the pivotal axis about which the first fixing portion 58 and the magnetic head 6 connected thereto are pivotable. The elastic hinge 62 can be made of a plastic and be secured to the magnetic head and the head support by glueing, but it is alternatively possible to make the elastic hinge of spring steel as in the first embodiment. Preferably, the location of the pivotal axis about which the magnetic head 6 is pivotable by the action of the element 57 is selected so that this axis is situated near the underside of the magnetic head in a plane containing the air gaps so that the previously described advantage of the minimum height variation of the magnetic head in the case of a small displacement of the magnetic head in the direction A is obtained during pivoting, while forces acting on the magnetic head are effectively taken up by the elastic hinge 62. As the longitudinal axis of the element 57 extends parallel to the transport direction A, the element 57 in the present embodiment is already fairly insensitive to forces exerted on the magnetic head 6 by the magnetic tape.

Figure 7:
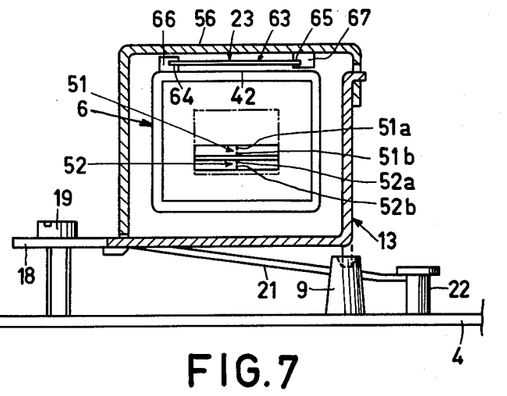
FIG. 7 is a partial cross-section and partial elevation on an enlarged scale of a part of a third embodiment of an apparatus in accordance with the invention.

In a third embodiment of an apparatus in accordance with the invention, shown in FIG. 7, a piezo-electric deflection element 63 is situated in the space bounded by the top wall 42 of the magnetic head 6 and that wall of the cover 56 which is parallel thereto.

The fixing portions 64 and 65 situated at opposite edges of the piezo-electric element 63 are fixed in U-shaped holders 66 and 67 respectively by glueing or clamping. These holders are preferably made of a ceramic material and are rigidly connected to the wall 42 and the cover 56 respectively. In this embodiment the holders 66 and 67 also constitute stops which limit the pivotal movement of the magnetic head 6 so as to protect the element 63 against overloading.

As in the preceding embodiment the pivotal axis about which the magnetic head 6 is pivotable is situated in a plane containing the air gaps 51 and 52, but in the present embodiment adjacent the top of the magnetic head, yielding similar advantages when the magnetic head is pivoted. The element 63 can be adapted to withstand all the forces exerted on the magnetic head 6 by making the element 63 comparatively wide in a direction perpendicular to the tape or cassette.

A further advantage of the construction is that owing to the compactness of the positioning device the size of the shield around the magnetic head can be so small that the casing generally used for such a magnetic head may be employed as the shield.

Figure 8:
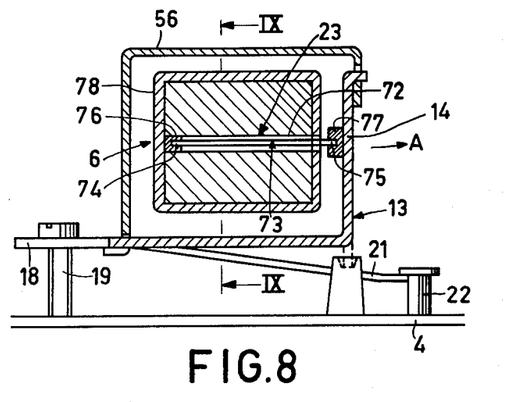
FIG. 8 is a partial cross-section and partial elevation on an enlarged scale of a part of a fourth embodiment of an apparatus in accordance with the invention.
Figure 9:
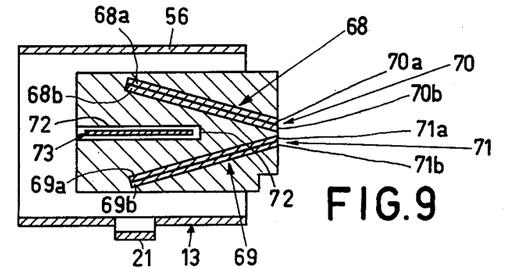
FIG. 9 shows a cross-section taken on the lines IX—IX in FIG. 8.

In the embodiment shown in FIGS. 8 and 9 the magnetic head 6 is provided with two magnetic cores 68 and 69 which bound air gaps 70 and 71 respectively. Like the air gaps 51 and 52 in the preceding embodiments, the air gaps 70 and 71 also are divided into gap halves 70a, 70b and 71a, 71b, and the magnetic cores 68 and 69 are each divided into adjacent core portions 68a, 68b and 69a, 69b respectively. The arrangement of the magnetic cores 68 and 69, as is shown in FIG. 9, is such that the magnetic cores 68 and 69 converge relative to each other in the direction of the head face of the magnetic head. Between the two magnetic cores a space 72 is formed in the magnetic head, in which space a piezoelectric deflection element 73 is situated over at least substantially its entire length. In its neutral position the element 73 extends approximately parallel to the frame portion 4 and is disposed at least substantially symmetrically relative to the air gaps 70 and 71. As in the embodiment of FIGS. 2 to 4, the element 73 is mounted on a vertical side wall 78 of the magnetic head 6 and the vertical supporting portion 14 of the head support 13 respectively by means of fixing portions 74 and 75 via holders 76 and 77 respectively. This ensures that the pivotal axis of the element 73, about which axis the head 6 is pivotable, is situated at least substantially at equal distances from the two air gaps 70 and 71 in a plane containing the two air gaps. As a result of this a pivotal movement of the head 6 in carrying out an azimuth correction causes substantially no height variation of the magnetic head relative to the information tracks on the tape and substantially no variation in the direction of tape transport A.

Moreover, as the longitudinal axis of the element 73 extends substantially in the direction A, the arrangement of the magnetic head 6 relative to the head support 13 is substantially insensitive to forces exerted on the magnetic head. This embodiment also provides a very compact arrangement, which may be accommodated in the normally used magnetic-head casing.

Instead of the magnetic cores 68 and 69 shown, it is advantageous if in this embodiment use is made of so-called thin-film heads, such as IRH (integral recording head) or MRH (magnetic resistance head).

It is to be noted that the control circuit of the apparatus in accordance with one of the preceding embodiments may be provided with a circuit as described in the non-prepublished Netherlands Patent Application No. 78 05802 to which U.S. patent application Ser. No. 41,021 filed May 21, 1979 corresponds (now U.S. Pat. No. 4,259,605), in order to ensure that during recording, when the positioning device 23 is inoperative, the magnetic head 6 occupies a well-defined neutral position, so that during recording the air gaps are in the correct perpendicular position relative to the longitudinal axis of the magnetic tape. Without such a circuit it is possible that in certain circumstances the element neutral position is not well-defined as a result of hysteresis effects, so that during recording the air gaps will assume an incorrect position.

Figure 10:
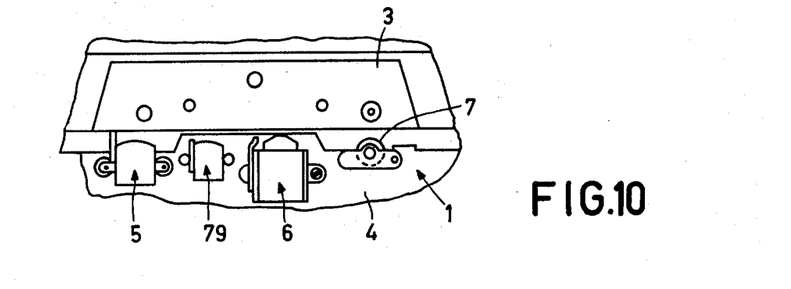
FIG. 10 is a plan view of a part of a fifth embodiment of an apparatus in accordance with the invention.

In a fifth embodiment of an apparatus in accordance with the invention as shown in FIG. 10, a magnetic recording head 79 is mounted on the frame portion 4 between the erase head 5 and the magnetic head 6, which in the present embodiment is only used for reproduction. Said magnetic recording head 79, in contradistinction to the magnetic reproducing head 6, is not provided with a positioning device, so that the azimuth-angle position of the head 79 remains fixed after assembly. The magnetic reproducing head 6 is provided with a piezo-electric deflection element in accordance with one of the preceding embodiments. It is possible to mount the magnetic heads 6 and 79 on a common head support and to accommodate the two heads within a shield, so that a minimal space is required. An advantage of this construction is that the position of the magnetic recording head 79 is not influenced by the positioning device of the magnetic reproducing head 6 and in particular the said hysteresis effects do not affect the position of the magnetic recording head 79, so that said circuit for correcting hysteresis effects is not required in the present embodiment.

It is to be noted that elements of each of the embodiments shown may be used in any of the other embodiments. As an example, it is possible to use the positioning devices of FIGS. 2-4 instead of the positioning devices in accordance with FIG. 6 or 7.

Furthermore, it is to be noted that instead of the piezo-electric deflection elements 33, 57, 63 and 73 described in the foregoing it is alternatively possible to employ a so-called electrostrictive deflection element. This element also has a bimorph structure, i.e. it comprises two plates with an electrically conductive layer (electrode) on both sides, which plates are glued to each other. Preferably, these plates are made of a ferro-electric ceramic material with a high dielectric constant. In order to obtain a deflection, the outer layers should be electrically biassed. The main advantage of such an electrostrictive element is the virtual absence of hysteresis, so that steps for elmininating hysteresis effects may not be necessary.

What is claimed is:

1. An apparatus for recording and/or reproducing information on a magnetic tape, comprising a frame portion, at least one head support arranged on said frame portion, a magnetic head having an air gap and carried on said head support, a magnetic shield for said head, and means for positioning the magnetic head with respect to the head support, said means comprising an electromechanical deflection element rigidly connected to the head support and having mounting portions, a mounting portion being connected to the magnetic head such that the magnetic head may be pivoted by the deflection element relative to the head support in order to adjust the azimuth angle position of the magnetic head, characterized in that said shield encloses both the magnetic head and the deflection element, the deflection element being disposed in a space bounded by a wall of the magnetic head, and said means further includes first and second holders for the deflection element, one of said holders being fixedly secured to the magnetic head and the other holder being fixedly secured to the head support, each said mounting portion of the deflection element being adjacent an opposite edge of the element and rigidly fixed to a respective one of said holders; a stop rigidly connected to the magnetic head; and another stop rigidly connected to the head support, said stops being so arranged that pivotal movement of the magnetic head relative to the head support is limited in both directions.

2. An apparatus as claimed in claim 1, characterized in that said space is also bounded by an inner wall of said shield; and each of said stops is formed by a stop portion of a respective holder.

3. An apparatus as claimed in claim 2, characterized in that each holder comprises two stop portions, and that pivotal movement of the magnetic head relative to the support in each direction is limited by abutment of one of the stop portions of one holder, against one of the stop portions of the other holder.

4. An apparatus as claimed in claim 2, characterized in that said space is bounded by an upper wall of the magnetic head and a detachable mounted cover part of the shield, said cover part forming part of said support.

5. An apparatus as claimed in claim 2, characterized in that said holders are U-shaped.

6. An apparatus as claimed in claim 1, characterized in that said deflection element is so arranged that the magnetic head is pivotable about an axis having a given location with respect to the head support, and that said positioning means further comprises at least one elastic hinge connecting the head to the head support, said hinge defining a hinge axis coincident with said axis.

7. An apparatus as claimed in claim 6, characterized by comprising two said elastic hinges, disposed on opposite sides of the deflection element, each of said hinges being connected to said holders.

8. An apparatus as claimed in claim 1, characterized by comprising at least one knife-edge bearing arranged as part of the support of the head support on the frame portion, said bearing permitting pivotal movement for adjustment of the azimuth-angle position of the magnetic head.

9. An apparatus as claimed in claim 1, having a magnetic head comprising two airgaps bounded by respective magnetic cores, characterized in that the deflection element is situated substantially completely within the magnetic head, symmetrically with respect to the airgaps, in a space formed between the magnetic cores.

10. An apparatus as claimed in claim 1, including both a magnetic recording head for recording information and a magnetic reproducing head for reproducing information, characterized in that only the magnetic reproducing head is connected to the head support by said positioning means.

11. An apparatus for recording and/or reproducing information on a magnetic tape, comprising a frame portion, at least one head support arranged on said frame portion, a magnetic head having an air gap and carried on said head support, a magnetic shield for said head, and means for positioning the magnetic head with respect to the head support, said means comprising an electromechanical deflection element rigidly connected to the head support and having mounting portions, a mounting portion being connected to the magnetic head such that the magnetic head may be pivoted by the deflection element relative to the head support in order to adjust the azimuth angle position of the maagnetic head, characterized in that said shield encloses both the magnetic head and the deflection element, the deflection element being disposed in a space bounded by a wall of the magnetic head, in a rest position said element extending substantially parallel to said wall, and said means further includes first and second holders for the deflection element, one of said holders being fixedly secured to the head support and the other of said holders being fixedly secured to the magnetic head, each said mounting portion of the deflection element being adjacent an opposite edge of the element and rigidly fixed to a respective one of said holders.

12. An apparatus as claimed in claim 11, characterized in that said magnetic shield includes a detachable mounted cover part, arranged such that said space is bounded by an upper wall of the magnetic head and said cover part.

13. An apparatus as claimed in claim 12, characterized in that at least one of said holders comprises a portion forming a stop arranged so as to limit pivotal movement of the magnetic head relative to the head support in one direction, and that said cover part is arranged such that pivotal movement of the magnetic head relative to the head support in said one direction is limited by abutment of the stop portion against the cover part.

14. An apparatus as claimed in claim 11, characterized in that at least one of said holders comprises a portion forming a stop arranged so as to limit pivotal movement of the magnetic head relative to the head support in one direction.

15. An apparatus as claimed in claim 11, characterized in that said deflection element is so arranged that the magnetic head is pivotable about an axis having a given location with respect to the head support, and that said positioning means further comprises at least one elastic hinge connecting the head to the head support, said hinge defining a hinge axis coincident with said axis.

16. An apparatus as claimed in claim 15, characterized by comprising two said elastic hinges, disposed on opposite sides of the deflection element, each of said hinges being connected to said holders.

17. An apparatus as claimed in claim 11, characterized by comprising at least one knife-edge bearing arranged as part of the support of the head support on the frame portion, said bearing permitting pivotal movement for adjustment of the azimuth-angle position of the magnetic head.

18. An apparatus as claimed in claim 11, having a magnetic head comprising two airgaps bounded by respective magnetic cores, characterized in that the deflection element is situated substantially completely within the magnetic head, symmetrically with respect to the airgaps, in a space formed between the magnetic cores.

19. An apparatus for recording and/or reproducing information on a magnetic tape, comprising a frame portion, at least one head support arranged on said frame portion, a magnetic head having an air gap and carried on said head support, a magnetic shield for said head, and means for positioning the magnetic head with respect to the head support, said means comprising an electromechanical deflection element rigidly connected to the head support and having mounting portions, a mounting portion being connected to the magnetic head such that the magnetic head may be pivoted by the deflection element relative to the head support in order to adjust the azimuth angle position of the magnetic head, characterized in that said shield encloses both the magnetic head and the deflection element, the deflection element being disposed in a space bounded by a wall of the magnetic head, the deflection element is so arranged in relation to the magnetic head that deflection of said element produces pivotal movement of the head about an axis which is perpendicular to a plane tangential to the head at the location of the air gap, and the mounting portions are so arranged that a plane which is perpendicular to a plane containing the air gap and which is situated at subtantially equal distances from two opposite walls of the head passes between the mounting portions throughout the range of movement of the magnetic head.

20. An apparatus as claimed in claim 19, characterized in that said deflection element is so arranged that the magnetic head is pivotal about an axis having a given location with respect to the head support, and that said positioning means further comprises at least one elastic hinge connecting the head to the head support, said hinge defining a hinge axis coincident with said axis.

21. An apparatus for recording and/or reproducing information on a magnetic tape, comprising a frame portion, at least one head support arranged on said frame portion, a magnetic head having an air gap and carried on said head support arranged for scanning a magnetic tape being transported in a direction of tape travel, said gap and said travel direction defining an orthogonal coordinate system, said head having a face defining a plane tangential thereto at the location of said gap, a magnetic shield for said head, and means for positioning the magnetic head with respect to the head support, said means comprising an electromechanical deflection element rigidly connected to the head support and having mounting portions, a mounting portion being connected to the magnetic head such that the magnetic head may be pivoted by the deflection element relative to the head support in order to adjust the azimuth angle position of the magnetic head, characterized in that said means further includes first and second holders for the deflection element, one of said holders being fixedly secured to the magnetic head and the other holder being fixedly secured to the head support, each said mounting portion of the deflection element being adjacent an opposite edge of the element and rigidly fixed to a respective one of said holders, and said electromechanical deflection element is a bimorph piezoelectric element, in a neutral position said element lying in a plane perpendicular to said plan tangential to the head face, said element and said holders being arranged such that the magnetic head is pivoted about an axis perpendicular to said tangential plane and lying substantially in a neutral position plane of said element, said axis being disposed with respect to said at least one magnetic air gap such that pivoting of the head translates said at least one gap, with respect to a tape being scanned, substantially only in one of the coordinate directions of said system.

22. An apparatus as claimed in claim 21, characterized in that said one direction is the direction of tape travel, whereby variation in signal strength resulting from azimuth angle correction is minimized.

23. An apparatus as claimed in claim 21, characterized in that said one direction is substantially perpendicular to said direction of tape travel, whereby wow and flutter resulting from azimuth angle correction is minimized.

24. An apparatus as claimed in claim 21, characterized in that said at least one air gap is a reproducing head gap.

25. An apparatus as claimed in claim 21 having a magnetic head comprising two airgaps bounded by respective magnetic cores, characterized in that the deflection element is situated substantially completely within the magnetic head, symmetrically with respect to the airgaps, in a space formed between the magnetic cores.

26. An apparatus as claimed in claim 21, characterized in that said deflection element is so arranged that the magnetic head is pivotable about an axis having a given location with respect to the head support, and that said positioning means further comprises at least one elastic hinge connecting the head to the head support, said hinge defining a hinge axis coincident with said axis.

27. An apparatus as claimed in claim 26, characterized by comprising two said elastic hinges, disposed on opposite sides of the deflection element, each of said hinges being connected to said holders.

28. An apparatus as claimed in claim 26, having a magnetic head comprising two airgaps bounded by respective magnetic cores, characterized in that the deflection element is situated substantially completely within the magnetic head, symmetrically with respect to the airgaps, in a space formed between the magnetic cores.

29. An apparatus as claimed in claim 26, characterized by comprising at least one knife-edge bearing arranged as part of the support of the head support on the frame portion, said bearing permitting pivotal movement for adjustment of the azimuth-angle position of the magnetic head.

30. An apparatus as claimed in claim 21, characterized in that at least one of said holders comprises at least one portion forming a stop, said stop portion being so arranged that pivotal movement of the magnetic head relative to the head support is limited in at least one direction.

* * * * *